US010617591B1

(12) United States Patent
Neville et al.

(10) Patent No.: US 10,617,591 B1
(45) Date of Patent: Apr. 14, 2020

(54) FOLDING SCOOTER

(71) Applicant: Pro-Motion Mobile Medical Marketing, LLC, The Woodlands, TX (US)

(72) Inventors: Robert E. Neville, The Woodlands, TX (US); Joshua Scott, Houston, TX (US)

(73) Assignee: Pro-Motion Mobile Medical Marketing, LLC, The Woodlands, TX (US)

( * ) Notice: Subject to any disclaimer, the term of this patent is extended or adjusted under 35 U.S.C. 154(b) by 0 days.

(21) Appl. No.: 15/920,890

(22) Filed: Mar. 14, 2018

Related U.S. Application Data

(60) Provisional application No. 62/471,111, filed on Mar. 14, 2017.

(51) Int. Cl.
| | | |
|---|---|---|
| *A61H 3/04* | (2006.01) | |
| *B62K 3/16* | (2006.01) | |
| *B62K 15/00* | (2006.01) | |
| *A61H 3/00* | (2006.01) | |

(52) U.S. Cl.
CPC ............... *A61H 3/04* (2013.01); *B62K 3/16* (2013.01); *B62K 15/008* (2013.01); *A61H 2003/005* (2013.01); *A61H 2003/046* (2013.01); *A61H 2201/0161* (2013.01); *A61H 2201/1253* (2013.01); *A61H 2201/164* (2013.01)

(58) Field of Classification Search
CPC ............... A61H 3/04; A61H 2003/046; A61H 2201/1253; A61H 2201/161; B62K 15/008; B62K 3/16

USPC .......................................... 280/87.021, 87.05
See application file for complete search history.

(56) References Cited

U.S. PATENT DOCUMENTS

| | | | | |
|---|---|---|---|---|
| 4,895,386 A * | 1/1990 | Hellestam | ............ | B62K 15/008 280/278 |
| 5,800,317 A | 9/1998 | Accetta | | |
| 6,196,566 B1 * | 3/2001 | Zhang | .................. | B62K 15/008 280/278 |
| 6,588,787 B2 | 7/2003 | Ou | | |
| 6,595,536 B1 * | 7/2003 | Tucker | .................. | B62K 15/00 280/278 |
| 7,055,842 B1 * | 6/2006 | Lin | ...................... | B62K 15/008 280/278 |
| 7,134,677 B2 | 11/2006 | Opsvik | | |
| 7,290,780 B2 * | 11/2007 | Hsu | ...................... | B62K 15/008 280/278 |
| 7,314,226 B2 | 1/2008 | Hsu | | |
| 7,780,180 B2 | 8/2010 | Hoepner et al. | | |
| 8,348,288 B1 * | 1/2013 | Laughon, Sr. | ........... | A61G 5/02 280/87.021 |

(Continued)

FOREIGN PATENT DOCUMENTS

CN          205469568          8/2016

*Primary Examiner* — Frank B Vanaman
(74) *Attorney, Agent, or Firm* — Bushman Werner, P.C.

(57) ABSTRACT

A scooter comprising a frame pivotally connected to a head stock assembly. A leg support is mounted on the frame. The head stock assembly comprises a handle bar stem having a wheel assembly attached at its lower end. There is a second wheel assembly attached to the frame assembly. The frame is movable generally vertically and horizontally relative to the head stock to allow the scooter to move from an expanded, use position to a folded or collapsed position for storage.

7 Claims, 3 Drawing Sheets

(56) References Cited

U.S. PATENT DOCUMENTS

| | | | |
|---|---|---|---|
| 8,523,211 B2 * | 9/2013 | Mailahn | A61H 3/04 |
| | | | 280/263 |
| 2004/0217565 A1 * | 11/2004 | Ramm | B62K 3/002 |
| | | | 280/87.01 |
| 2006/0033297 A1 | 2/2006 | Miller | |
| 2007/0164528 A1 | 7/2007 | Morath | |
| 2009/0152829 A1 * | 6/2009 | Anderson | B62K 3/002 |
| | | | 280/278 |
| 2015/0093182 A1 * | 4/2015 | Wu | A61H 3/04 |
| | | | 403/109.6 |
| 2016/0221629 A1 * | 8/2016 | Behar | B62J 1/28 |
| 2017/0190377 A1 * | 7/2017 | Ku | B62D 61/04 |

* cited by examiner

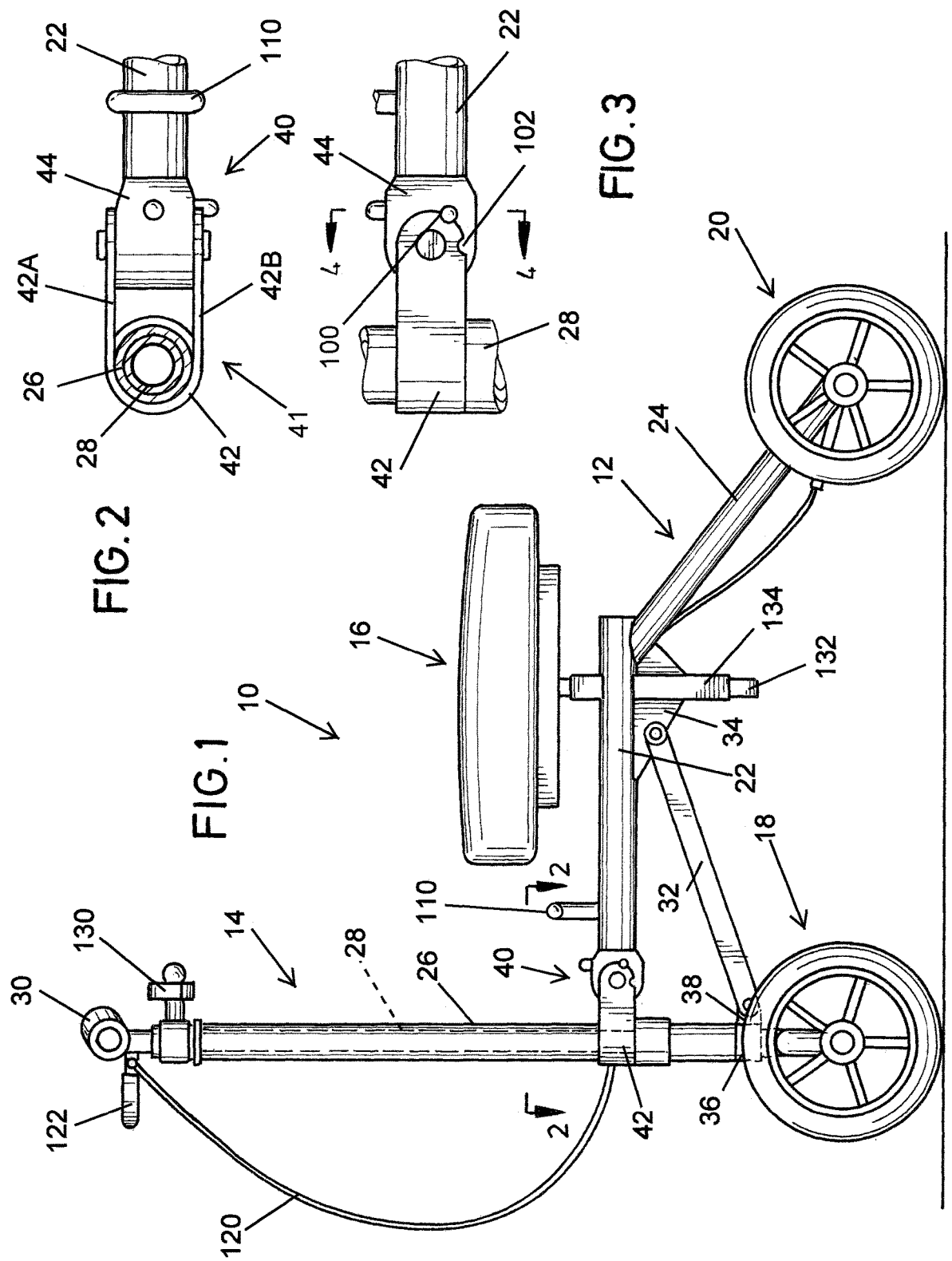

FOLDING SCOOTER

CROSS REFERENCE TO RELATED APPLICATION

This application claims priority to U.S. Application No. 62/471,111 filed on Mar. 14, 2017, the disclosure of which is incorporated herein by reference for all purposes.

FIELD OF THE INVENTION

The present invention relates to manually propelled scooters for use by an individual having an injured leg and, more particularly, to folding knee scooters.

BACKGROUND OF THE INVENTION

Aging of the population has resulted, inter alia, in an increased use of mobile support vehicles to assist people with foot, leg, and knee injuries to move about without the need for crutches, wheel chairs or the like. In particular, one type of mobile support vehicle which is in widespread use is commonly referred to as a knee scooter. Knee scooters are generally used when the user has one disabled leg that has been injured to the extent that walking is either quite painful or precluded. Typically, these knee scooters have a wheeled frame on which is mounted a padded support or the like such that the user can rest the shin and/or knee of the disabled leg on the padded support while grasping suitable handle bars to affect steering, the ambulatory leg of the user being used to propel the scooter.

SUMMARY OF THE INVENTION

In one aspect, the present invention provides a knee scooter which is collapsible or foldable for storage and/or transport.

In another aspect, the present invention provides a foldable knee scooter which can be selectively moved from a first, folded position into a second, expanded or use position.

In a further aspect, the present invention provides a foldable knee scooter which can be selectively latched or locked in a folded position for storage or transport or in an expanded position for use.

These and further features and advantages of the present invention will become apparent from the following detailed description, wherein reference is made to the figures in the accompanying drawings.

BRIEF DESCRIPTION OF THE DRAWINGS

FIG. 1 is a side elevational view of one embodiment of the knee scooter of the present invention.

FIG. 2 is a view taken along the lines 2-2 of FIG. 1.

FIG. 3 is a side, elevational view of a portion of the scooter shown in FIG. 2.

DETAILED DESCRIPTION OF PREFERRED EMBODIMENTS

Figure 4:
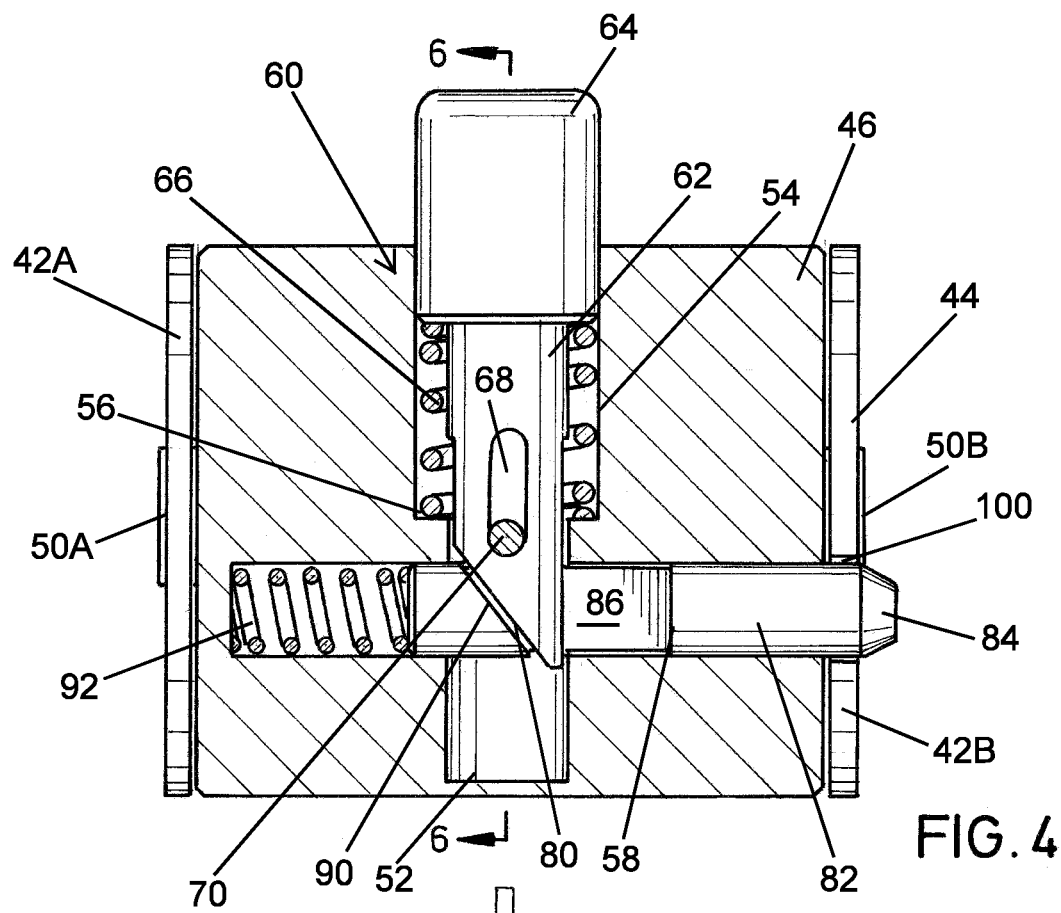
FIG. 4 is a view taken along the lines 4-4 of FIG. 3.

Referring first to FIG. 1, the scooter of the present invention, shown generally as 10, comprises a frame shown generally as 12, a head stock assembly shown generally as 14, a preferably padded knee or leg support 16 mounted on frame 12, a front wheel assembly shown generally as 18, and a rear wheel assembly shown generally as 20.

Frame 12 comprises a beam 22 and a strut 24 connected to beam 22 at an obtuse angle thereto. Connected to the end of strut 24 distal beam 22 is a rear wheel assembly 20.

Head stock assembly 14 comprises a tubular column 26 in which is rotatably journaled a handle bar stem 28 shown in phantom. A front wheel assembly 18 is connected to handle bar stem 28 adjacent the lower end of column 26. Handle bars or other such hand grips 30 are interconnected to handle bar stem 28 whereby rotation of handle bars 30 results in rotation of handle bar stem 28 and concomitant rotation of front wheel assembly 18. A forked strut 32 having first and second strut members, only one of which is shown, is pivotally connected on one end to column 26 via collar 36 having a clevis portion 38 and on the other end to frame 12 via bracket 34. Strut 32 ensures that column 26 does not rotate relative to the frame 12.

The term "wheel assembly" as used herein can refer to a single wheel or two wheels. Thus, the scooter 10 could have a single front wheel and a single rear wheel, albeit that may be undesirable for a person with a leg injury. More commonly, one of the front wheel assembly 18 or the rear wheel assembly 20 could be of the two-wheeled variety, and the other of the one-wheeled variety. Still more frequently and preferred, wheel assemblies 18 and 20 could both be comprised of two wheels laterally spaced and rotatably mounted on suitable axles.

In the embodiment shown in FIG. 1, scooter 10 is in the expanded or use position. In this position, a person with an injured leg, foot, or knee could place the knee/shin of the injured leg on the support 16, grasp the handle bars 30 and propel scooter 10 with the ambulatory leg. It should be noted that the scooter 10 of the present invention may be used irrespective of which of the user's legs is injured.

Figure 7:
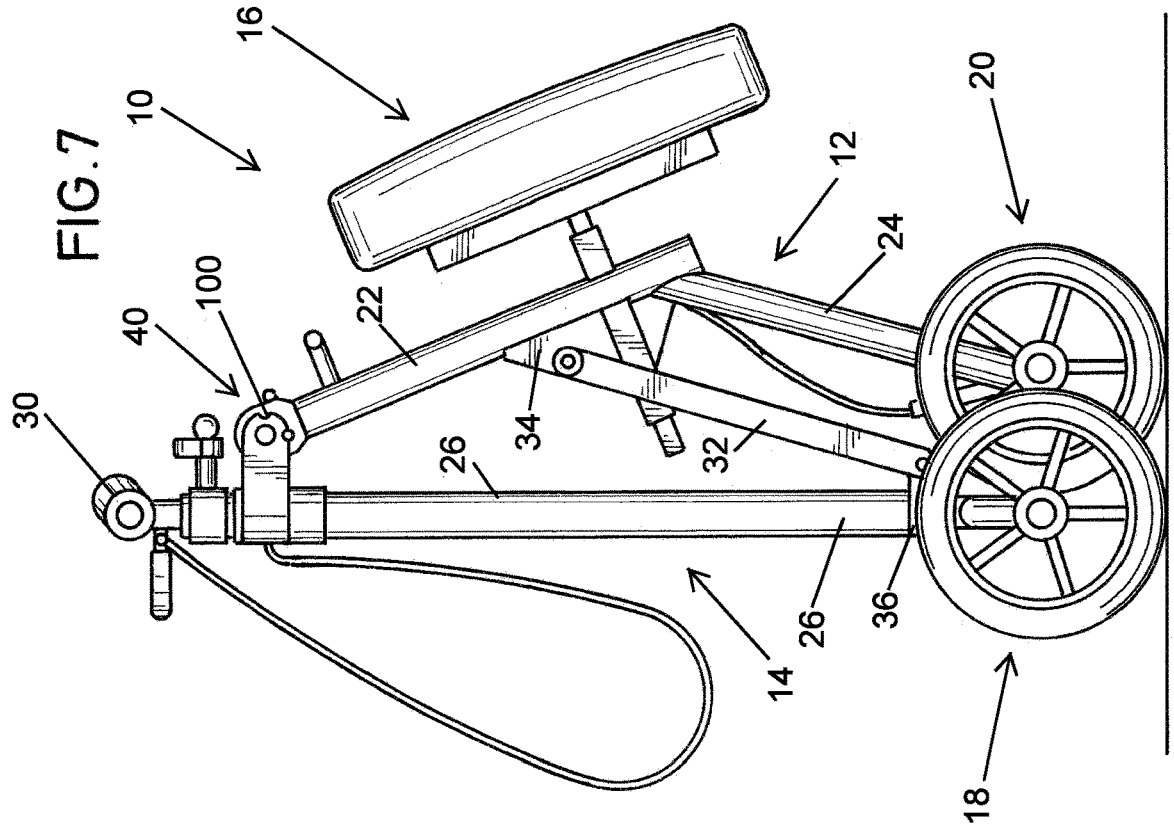
FIG. 7 is a side elevational view of the scooter of FIG. 1 in a folded position for storage or transport.

With reference next to FIG. 7, scooter 10 is shown in the collapsed, or folded position for storage and/or transport, e.g., placing in the trunk of a car. Movement between the expanded position shown in FIG. 1 and the folded position shown in FIG. 7 is effected via a hinge assembly shown generally as 40. As best seen in FIG. 2, hinge assembly 40 comprises a clevis 41 having a collar portion 42 slidably mounted on column 28, and spaced tangs 42A and 42B. Received between tangs 42A and 42B is a selectively releasable latch assembly 44 described more fully below.

Figure 5:
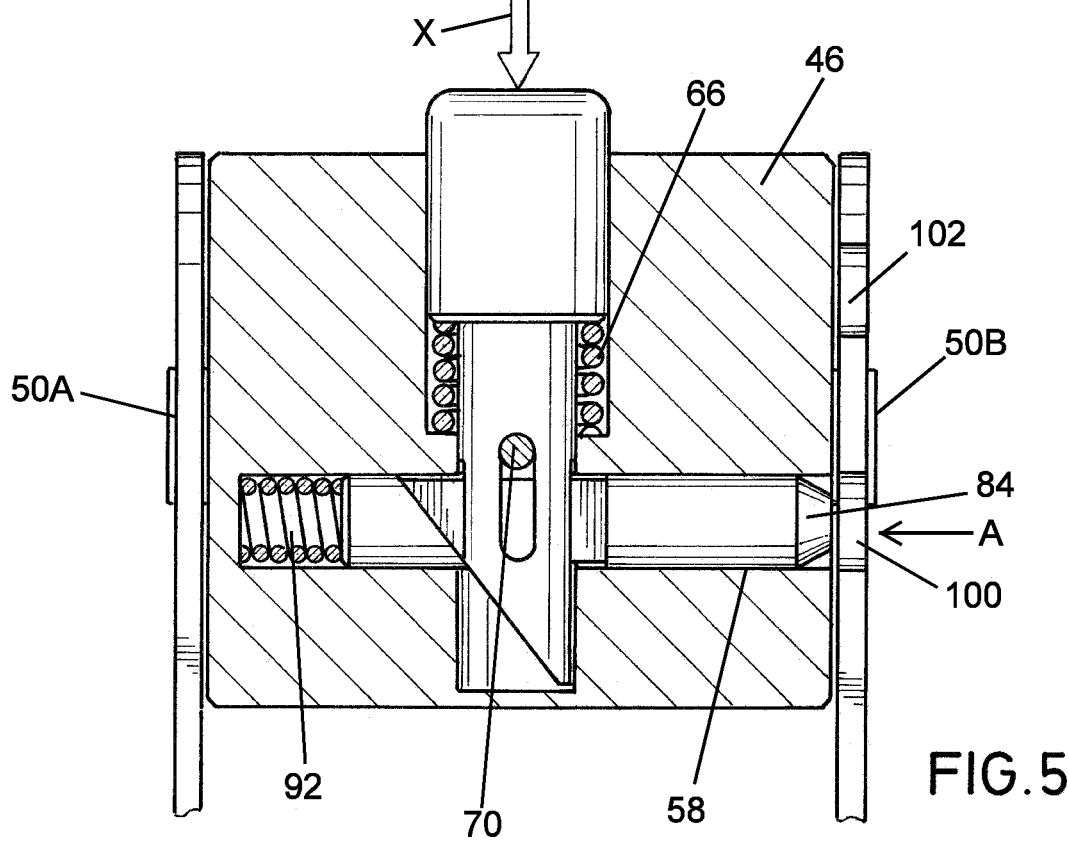
FIG. 5 is a view similar to FIG. 4 showing the latching mechanism used in the scooter of the present invention in a released position.
Figure 6:
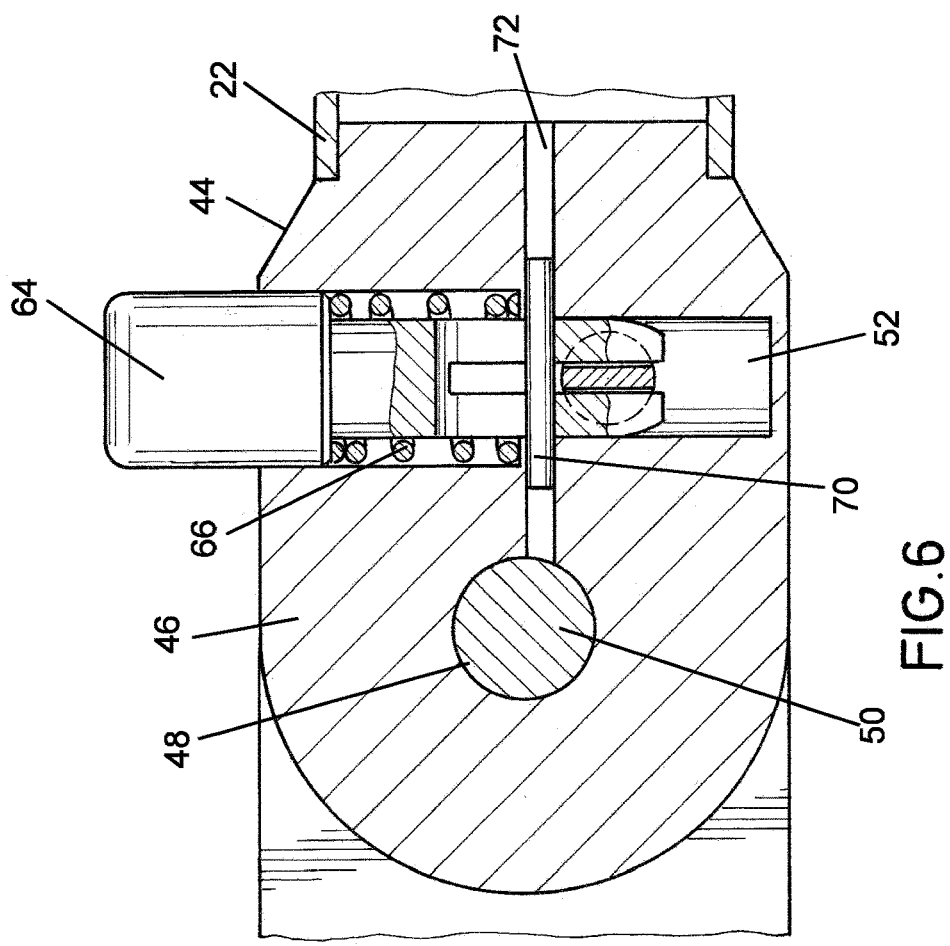
FIG. 6 is a view taken along the lines 6-6 of FIG. 5.

Referring now to FIGS. 4, 5, and 6, the latch assembly 44 is shown in greater detail. Latch assembly 44 comprises a body 46 having a throughbore 48, an axle 50 being rotatably received in throughbore 48. As best seen in FIGS. 4 and 5 axle 50 is provided with end caps or flanges 50A and 50B which hold axle 50 in body 46. As best seen in FIG. 6, body 46 is connected, e.g., by welding or the like, to beam 22. Body 46 has a blind bore 52 coaxially formed with a counter bore 54, an annular shoulder 56 being formed at the intersection of blind bore 52 and counter bore 54. There is a second blind bore 58 formed in body 46, blind bore 58 being transverse to but intersecting blind bore 52. A spring plunger assembly shown generally as 60 is received in counter bore 54. Plunger assembly 60 comprises a shank portion 62 connected to a head or button 64, button 64 extending externally of body 46. A compression spring 66 is disposed in counter bore 54 in surrounding relationship to shank portion 62 of spring plunger 60 and, as seen in FIG. 4, is positioned between head portion 64 and shoulder 56. Shank portion 62 of spring plunger 60 has a longitudinally extending slot 68 through which extends a retainer pin 70, pin 70 being received in a bore 72 in body 46 which is generally transverse to bores 48 and 52. The innermost end of shank portion 62 has a generally planar chamfered surface 80.

Received in bore 58 is a latching pin 82. Latching pin 82 has a nose portion 84 and a recess 86 disposed between nose 84 and the opposite end of pin 82. As best seen with reference to FIGS. 4 and 5, recess 86 is at least partially formed by a chamfered wall 90, chamfered wall 90 being at an angle complementary to chamfered surface 80 of spring plunger 60. Disposed between the inner end of latching pin 82 and the bottom of blind bore 58 is a compression spring 92.

In the position shown in FIG. 4, scooter 10 would be in the configuration shown in FIG. 1, in that regard, the nose 84 of latching pin 82 would be received in the notch 100 formed in the outer edge of tang 42B (see FIGS. 2 and 3).

To move scooter 10 from the position shown in FIG. 1 to the position shown in FIG. 7, and with reference to FIGS. 4 and 5, it can be seen that if button 64 of spring plunger assembly 60 is depressed as shown by the arrow X in FIG. 5, spring 66 will be compressed and chamfered surface 80 of shank 62, acting as a linear cam, will engage chamfered wall 90 of latching pin 82, move latching pin 82 in the direction of arrow A shown in FIG. 5, and compress spring 92 as shown in FIG. 5. Concomitantly, nose 84 will move out of notch 100 whereby body 46 can be rotated until nose 84 is in register with notch 102 at which point spring 92 will force nose 84 of latching pin 82 into engagement with notch 102. In that position, scooter 10 will be locked or latched in the collapsed or folded position shown in FIG. 7. It should be noted that strut 32 also serves the purpose of maintaining frame 12 and column 26 in an aligned position such that rear wheel assembly 20 moves smoothly toward front wheel assembly 18 as scooter 10 is moved to its collapsed position.

In operation to fold or collapse scooter 10, i.e., move scooter 10 from the position shown in FIG. 1 to the position shown in FIG. 7, the user would grasp T-handle 110 with the four fingers of a hand and, using the thumb of that hand, depress button 64 of spring plunger assembly 60. This will disengage locking pin 82 from notch 100 in the manner described above. By pulling the handle 110 upwardly, collar 42 will slide upwardly along column 28 until latching pin 82 is in register with notch 102 at which point nose 84 will engage notch 102, locking or latching scooter 10 in the position shown in FIG. 7. It will be appreciated that once the head portion or button 64 of spring plunger assembly 60 is depressed sufficiently to move latching pin 82 from the position shown in FIG. 4 to the position shown in FIG. 5, rotation of body 46 can occur until latching pin 82 is in register with notch 102. In other words, it is only necessary to depress head or button 64 of spring plunger 60 until the nose 84 of latching pin 82 is out of notch 100 and in engagement with tang 42B.

It will be understood that to move scooter 10 from the position shown in FIG. 7 to the position shown in FIG. 1, it is again only necessary to depress button 64 until latching pin 82 is out of engagement with notch 102 and apply a slight downward force on handle 110 to force collar 42 to slide downwardly along column 26 which will move rear wheel assembly 20 away from front wheel assembly 18 until scooter 10 has reached the position shown in FIG. 1 which again will result in engagement of latching pin 82 with notch 100. Thus, in the embodiment described above, scooter 10 can be locked or latched in the folded or collapsed position shown in FIG. 7 or in the expanded or use position shown in FIG. 1. It should be noted that this latching or locking feature is particularly advantageous when scooter 10 is in the folded position shown in FIG. 7. In this regard, a user wishing to load scooter 10 into the trunk of the car can be assured that scooter 10 will remain upright as shown in FIG. 7 and can be easily lifted and placed into the trunk of the car without fear that scooter 10 will suddenly unfold since that cannot occur without the action described above i.e., pressing button 64 and effecting rotation of body 46.

Scooter 10 can also be provided with a rear brake assembly controlled by brake cable 120 and brake lever 122. As is apparent, the height of handle bar 30 can be vertically adjusted with an adjustment knob assembly 130 such as for example a knob plunger pin, a pull plunger pin, or a pop pin. Desirably, the locking assembly 130 is of a type that, when engaged, eliminates any play between handle 30 and handle bar stem 28.

As will also be apparent, support or knee rest 16 can be adjusted in height by positioning seat stem 132 at a desired location in sleeve 134. To this end a locking assembly described above with respect to locking assembly 130 can be employed. Also, a simple ball detent arrangement can be employed to releasably, selectively lock stem 132 at various positions in sleeve 134.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A scooter comprising:
    a frame, said frame comprising a beam having a first end and a second end, and a strut having a first end and a second end, said first end of said strut being connected to said beam proximate said second end of said beam;
    a leg support mounted on said beam;
    a rear wheel assembly connected to said second end of said strut;
    a head stock assembly comprising:
        a tubular column having an upper end and a lower end;
        a handle bar stem having a first end and a second end, said handle bar stem being rotatably journaled in said tubular column;
        a handle bar connected to said first end of a said handle bar stem;
        a front wheel assembly connected to said second end of said handle bar stem; and
        a joint assembly interconnecting said tubular column and said first end of said beam, said joint assembly comprising a sleeve slidably mounted on said column and a latch assembly interconnecting said sleeve and said first end of said beam, said latch assembly being selectively operable to lock said beam in a first position, wherein said beam is at a first angle to said column and said sleeve is proximate said lower end of said column, and a second position, wherein said beam is at a second smaller angle to said column and said sleeve is proximate said upper end of said column.

2. The scooter of claim 1, wherein said latch assembly comprises:

a body having a first bore extending into said body, a second bore extending into said body and intersecting said first bore;

a plunger disposed in and extending from said first bore, said plunger having a first chamfered surface;

a latching pin disposed in and extending from said second bore, said latching pin having a second chamfered surface, said first and second chamfered surfaces engaging one another such that movement of said plunger in a first direction causes movement of said latching pin further into said second bore.

3. The scooter of claim 2, wherein said latching assembly biases said plunger and said latching pin outwardly.

4. The scooter of claim 2, wherein said body has first and second notches in it;

said latching pin has a nose on an outermost end, said nose of said latching pin being positioned in said first notch when said scooter is in said first position, and said nose of said latching pin being positioned in said second notch when said scooter is in said second position.

5. The scooter of claim 1, further comprising a brake assembly.

6. The scooter of claim 1, wherein said handle bar stem is selectively adjustable in said tubular column.

7. A scooter comprising:

a frame, said frame comprising a beam having a first end and a second end, and a strut having a first end and a second end, said first end of said strut being connected to said beam proximate said second end of said beam;

a leg support mounted on said beam;

a rear wheel assembly connected to said second end of said strut;

a head stock assembly comprising:

a tubular column having an upper end and a lower end;

a handle bar stem having a first end and a second end, said handle bar stem being rotatably journaled in said column;

a hand grip connected to said first end of said handle bar stem;

a front wheel assembly connected to said second end of said handle bar stem; and a joint assembly interconnecting said column and said first end of said beam, said joint assembly comprising a clevis assembly having a sleeve slidably mounted on said column and first and second spaced tangs pivotably connected to said beam, whereby said beam is movable between a first position wherein said beam is at a first angle to said column and said sleeve is proximate said lower end of said column, and a second position, wherein said beam is at a second smaller angle to said column and said sleeve is proximate said upper end of said column.

* * * * *